United States Patent
Sugino et al.

(10) Patent No.: US 7,145,625 B2
(45) Date of Patent: Dec. 5, 2006

(54) LIQUID CRYSTAL DISPLAY DEVICE HAVING HEATER

(75) Inventors: Michiyuki Sugino, Chiba (JP); Takashi Yoshii, Yaita (JP)

(73) Assignee: Sharp Kabushiki Kaisha, Osaka (JP)

(*) Notice: Subject to any disclaimer, the term of this patent is extended or adjusted under 35 U.S.C. 154(b) by 26 days.

(21) Appl. No.: 10/449,518

(22) Filed: Jun. 2, 2003

(65) Prior Publication Data

US 2003/0231157 A1  Dec. 18, 2003

(30) Foreign Application Priority Data

Jun. 12, 2002 (JP) ............... 2002-170790
Jul. 18, 2002 (JP) ............... 2002-209342
Apr. 17, 2003 (JP) ............... 2003-112498

(51) Int. Cl.
 *G02F 1/1333* (2006.01)
(52) U.S. Cl. ...................................... 349/161
(58) Field of Classification Search ................. 349/161
 See application file for complete search history.

(56) References Cited

U.S. PATENT DOCUMENTS

| | | | |
|---|---|---|---|
| 3,807,165 A * | 4/1974 | Kawada | 368/257 |
| 4,773,735 A | 9/1988 | Ukrainsky et al. | |
| 4,901,147 A * | 2/1990 | Tajima | 348/189 |
| 5,088,806 A | 2/1992 | McCartney et al. | |
| 5,164,849 A * | 11/1992 | Evans et al. | 349/72 |
| 5,299,038 A | 3/1994 | Hamada et al. | |
| 6,133,979 A | 10/2000 | Komatsu et al. | |
| 6,211,852 B1 | 4/2001 | Oono et al. | |
| 6,898,762 B1 * | 5/2005 | Ellis et al. | 715/716 |

FOREIGN PATENT DOCUMENTS

| | | |
|---|---|---|
| JP | 63-161432 A | 7/1988 |
| JP | 64-059330 A | 3/1989 |
| JP | 1-140520 U | 9/1989 |
| JP | 3-33720 A | 2/1991 |
| JP | 03-098085 A | 4/1991 |
| JP | 04-204415 A | 7/1992 |
| JP | 4-318516 A | 11/1992 |
| JP | 4-365094 A | 12/1992 |
| JP | 10-228013 A | 8/1998 |
| JP | 10 333124 | 12/1998 |
| JP | 10-333124 A | 12/1998 |
| JP | 11-345445 A | 12/1999 |
| JP | 2000-036143 A | 2/2000 |
| WO | WO-97/05519 | 2/1997 |

\* cited by examiner

*Primary Examiner*—Andrew Schechter
*Assistant Examiner*—Richard H Kim
(74) *Attorney, Agent, or Firm*—Birch, Stewart, Kolasch & Birch, LLP

(57) ABSTRACT

A liquid crystal display device capable of presenting to a viewer a high-quality video from the beginning of viewing the video on a liquid crystal display panel by heating the panel from a specified time earlier than a time preset to start the viewing. A liquid crystal display device for displaying a video on a liquid crystal display panel having a liquid crystal layer and electrodes for applying a data voltage to the liquid crystal layer is further provided with an inputting means for inputting time information for reserving viewing a video program and a heating means for warming the liquid crystal display panel for a specified period before the time preset to start the viewing. The period of warming the liquid crystal display panel is determined based on a working ambient temperature.

14 Claims, 8 Drawing Sheets

FIG.6A

CURRENT FRAME DATA

|     | 0 | 32 | 64  | 96  | 128 | 160 | 192 | 224 | 255 |
|-----|---|----|-----|-----|-----|-----|-----|-----|-----|
| 0   | 0 | 70 | 147 | 182 | 206 | 227 | 241 | 255 | 255 |
| 32  | 0 | 32 | 94  | 142 | 177 | 202 | 224 | 239 | 255 |
| 64  | 0 | 0  | 64  | 116 | 157 | 193 | 218 | 241 | 255 |
| 96  | 0 | 0  | 31  | 96  | 141 | 177 | 209 | 234 | 255 |
| 128 | 0 | 0  | 18  | 71  | 128 | 169 | 203 | 232 | 255 |
| 160 | 0 | 0  | 0   | 53  | 111 | 160 | 199 | 230 | 255 |
| 192 | 0 | 0  | 0   | 29  | 92  | 148 | 192 | 228 | 255 |
| 224 | 0 | 0  | 0   | 13  | 55  | 133 | 183 | 224 | 255 |
| 255 | 0 | 0  | 0   | 0   | 48  | 117 | 173 | 220 | 255 |

PREVIOUS FRAME DATA

CONTENT OF TABLE MEMORY ROM 11a
(LEVEL 1)

FIG.6B

CURRENT FRAME DATA

|     | 0 | 32 | 64  | 96  | 128 | 160 | 192 | 224 | 255 |
|-----|---|----|-----|-----|-----|-----|-----|-----|-----|
| 0   | 0 | 51 | 118 | 165 | 194 | 214 | 230 | 242 | 255 |
| 32  | 0 | 32 | 120 | 159 | 183 | 206 | 226 | 240 | 255 |
| 64  | 0 | 12 | 64  | 110 | 150 | 182 | 209 | 234 | 255 |
| 96  | 0 | 0  | 48  | 96  | 140 | 175 | 204 | 232 | 255 |
| 128 | 0 | 0  | 43  | 81  | 128 | 167 | 201 | 232 | 255 |
| 160 | 0 | 0  | 35  | 66  | 117 | 160 | 196 | 229 | 255 |
| 192 | 0 | 0  | 2   | 56  | 105 | 152 | 192 | 227 | 255 |
| 224 | 0 | 0  | 0   | 50  | 85  | 139 | 186 | 224 | 255 |
| 255 | 0 | 0  | 0   | 44  | 75  | 136 | 181 | 215 | 255 |

PREVIOUS FRAME DATA

CONTENT OF TABLE MEMORY ROM 11b
(LEVEL 2)

LEVEL···ENHANCING PARAMETER
Th···THRESHOLD TEMPERATURE FOR CHANGING PARAMETERS

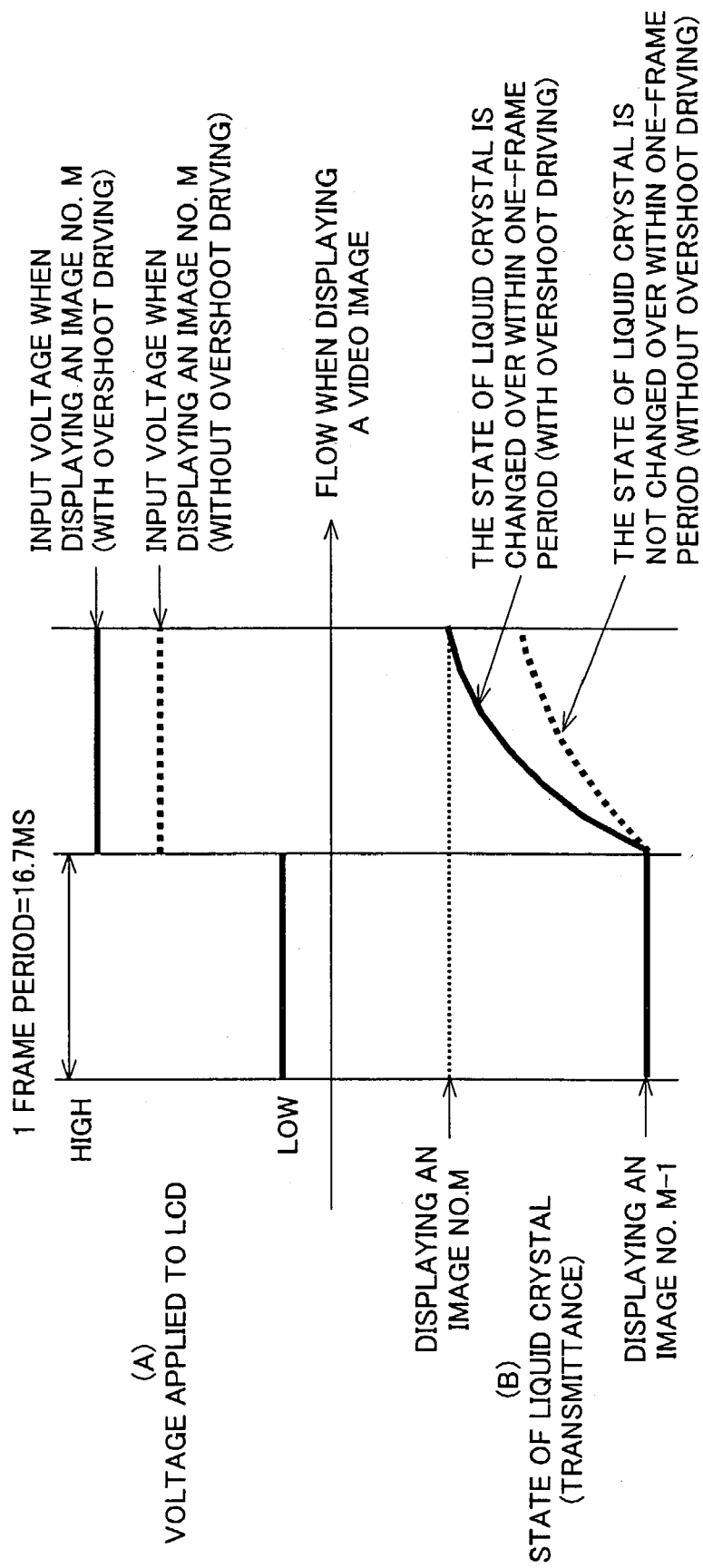

LIQUID CRYSTAL DISPLAY DEVICE HAVING HEATER

BACKGROUND OF THE INVENTION

The present invention relates to a liquid crystal display device for displaying video on a liquid crystal display panel and more specifically to a liquid crystal display device allowing viewers to preset a time to start viewing a video program on the LCD panel screen.

Recent development of lighter and thinner personal computers and television receivers has been accompanied by development of lighter and thinner display devices. To meet the above demand, there have been developed, in place of cathode-ray tube (CRT) type displays, flat panel type displays (FPD) such as liquid crystal display (LCD) devices using LCD panels each having a liquid crystal layer and electrodes for applying data voltages to the liquid crystal layer.

A liquid crystal display (LCD) is a display device capable of providing desirable images by applying data voltages to a liquid crystal layer held between two substrates and controlling the intensity of an electric field to a liquid crystal layer having dielectric anisotropy so as to control the quantity of light passing through the substrates. The liquid crystal display thus constructed is representative of portable flat panel type displays. The most popular display is known as a TFT LCD using a thin film transistor (TFT) as a switching element.

However, it is well known that the liquid crystal has a temperature characteristic featured by extremely low response to an input signal at a low temperature. Recently, liquid crystal displays are not only used as display devices of personal computers but also used as display devices of television receivers and have increasing demand for displaying video programs. However, the response of the liquid crystal decreases at a low temperature, so the LCD suffers such drawback that the quality of a video image displayed thereon extremely decreases at a low ambient temperature, resulting in appearance of afterimage and/or tailing of the image, etc.

To solve the above problem regarding the low response speed of the LCD at a low temperature, Japanese Laid-open Utility Model Publication No. 1-140520, Japanese Laid-open Patent Publication No. 3-33720 and Japanese Laid-open Patent Publication No. 10-228013 propose the provision of a heating element or a heater to promptly improve the response characteristic of liquid crystal at a low temperature by forcibly heating the LCD panel to a temperature at which it can normally work.

Japanese Laid-open Patent Publication No. 10-333124 discloses a liquid crystal display (LCD) wherein, when a signal from a temperature sensor indicates a temperature at which the liquid crystal display element cannot normally operate, then the voltage applied to a white heat valve (light source) is increased to heat the LCD element, thereby improving the response of the LCD element at a low temperature without additional heater such as heating wire element and so on.

However, the above conventional arts prevent the degradation of an image displayed on the LCD by heating the LCD panel when displaying input video after switching on the main power supply but still involve a problem that viewers should view the degraded video on the LCD until the LCD reaches the normal working temperature.

SUMMARY OF THE INVENTION

An object of the present invention is to provide a liquid crystal display device which can display a high quality video image just from the time preset to start viewing video thereon by heating in advance for a specified time the LCD panel to the temperature at which a correct image can be displayed thereon.

Another object of the present invention is to provide a liquid crystal display device for displaying a video on a liquid crystal display panel, wherein it is provided with a heating means for warming the LCD panel for a specified period before the time preset to start the viewing. The LCD panel can be thus warmed up to a predetermined temperature (necessary for displaying a correct image) till the time preset to start viewing the video. One can view a high-quality video image on the LCD panel just from the beginning of viewing.

Another object of the present invention is to provide a liquid crystal display device for displaying a video on a liquid crystal display panel, wherein a specified time for preheating the LCD panel is determined in accordance with an ambient temperature. This makes it possible to minimize the period of driving the heating means, thus saving the power consumption.

Another object of the present invention is to provide a liquid crystal display device for displaying a video on a liquid crystal display panel, wherein the heating means is a backlight source for illuminating the LCD panel. This can warm up the LCD panel with no need of providing any additional member such as a heater etc. and can also stabilize the operation of the backlight source itself when the beginning of viewing video.

Another object of the present invention is to provide a liquid crystal display device for displaying a video on a liquid crystal display panel, wherein the heating means uses merely part of the backlight source for illuminating the LCD panel. This can save the power consumption in comparison with the case of driving all of the backlight source.

Another object of the present invention is to provide a liquid crystal display device for displaying a video on a liquid crystal display panel, wherein the heating means uses merely part of the backlight source, which part illuminates the lower part of the LCD panel. This can save the power consumption and heat a whole surface of the LCD panel evenly and effectively.

Another object of the present invention is to provide a liquid crystal display device for displaying a video on a liquid crystal display panel, wherein an OSD (On-Screen Display) indicator is presented to indicate that the heating means is operating. This enables users to visually recognize on the screen the state of the liquid crystal display device being in the warm-up mode.

Another object of the present invention is to provide a liquid crystal display device for displaying a video on a liquid crystal display panel, which is provided with a storage means for holding enhancing parameters to make the LCD panel respond to transmittance decided by an input image signal (input video signal) after a period of one vertical scan, an enhancing means for compensating optical response characteristic of the LCD panel by enhancing the input image signal with the enhancing parameters and a heating means for warming the LCD panel for a specified period before the time preset to start viewing the video so that the LCD panel can reach at the viewing start time a reference temperature of the ambient conditions under which the enhancing parameters were actually measured. This enables the LCD device to reliably respond to the transmittance decided by any input image signal (i.e., a target gradation level luminance) at the viewing start time after one vertical scanning period, thus presenting the high quality video from the viewing start time.

A further object of the present invention is to provide a liquid crystal display device for displaying a video on a liquid crystal display panel, wherein the storage means holds a plurality of enhancing parameters for responding to respective transmittance decided by an input image signal after one vertical scan period under a plurality of different reference temperature conditions and the heating means can apply heat to the LCD panel so that the LCD panel can be warmed up to the lowest reference temperature which is higher than the working ambient temperature at the preset viewing start time. This can shorten the period of preheating the LCD device, thereby saving the power consumption.

A still further object of the present invention is to provide a liquid crystal display device for displaying a video on a liquid crystal display panel, wherein the storage means is a table memory holding an enhancing parameters specified by an image signal of a current vertical scan period and an image signal of a previous vertical scan period. This enables the LCD device to reliably compensate optical response characteristic of its LCD panel to any video image having any gradation level transition and present desirable gradation levels of the video.

BRIEF DESCRIPTION OF THE DRAWINGS

FIGS. 6A and 6B are schematic illustrations of an example of an OS (overshoot) table memory for a liquid crystal device according to another embodiment of the present invention.

FIG. 8 is a graph showing a relationship between a voltage applied to a liquid crystal and a response of a liquid crystal of LCD device according to another embodiment of the present invention.

PREFERRED EMBODIMENTS OF THE INVENTION

Figure 2:
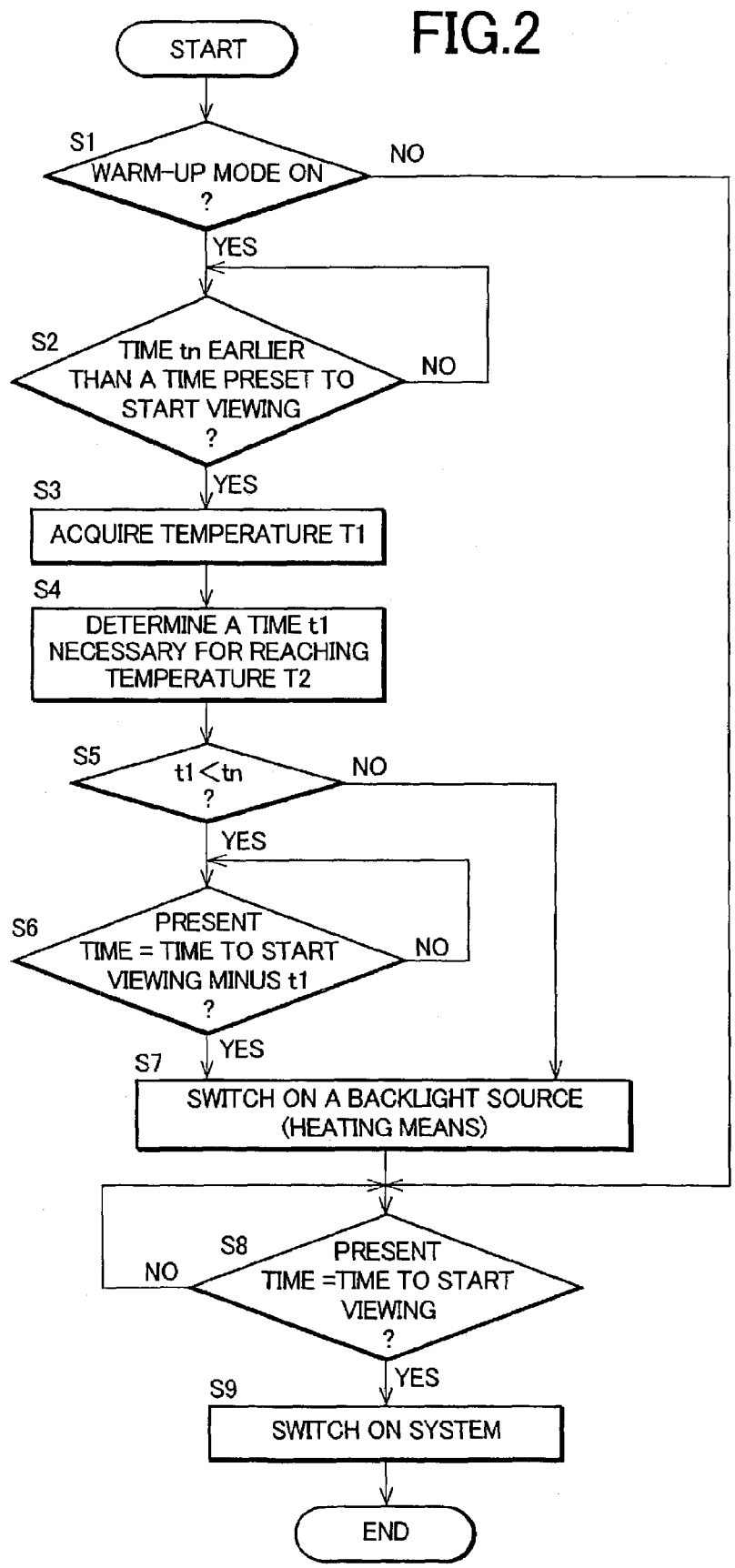
FIG. 2 is a flowchart depicting the on-timer operation of a liquid crystal display device according to an embodiment of the present invention.
Figure 3:
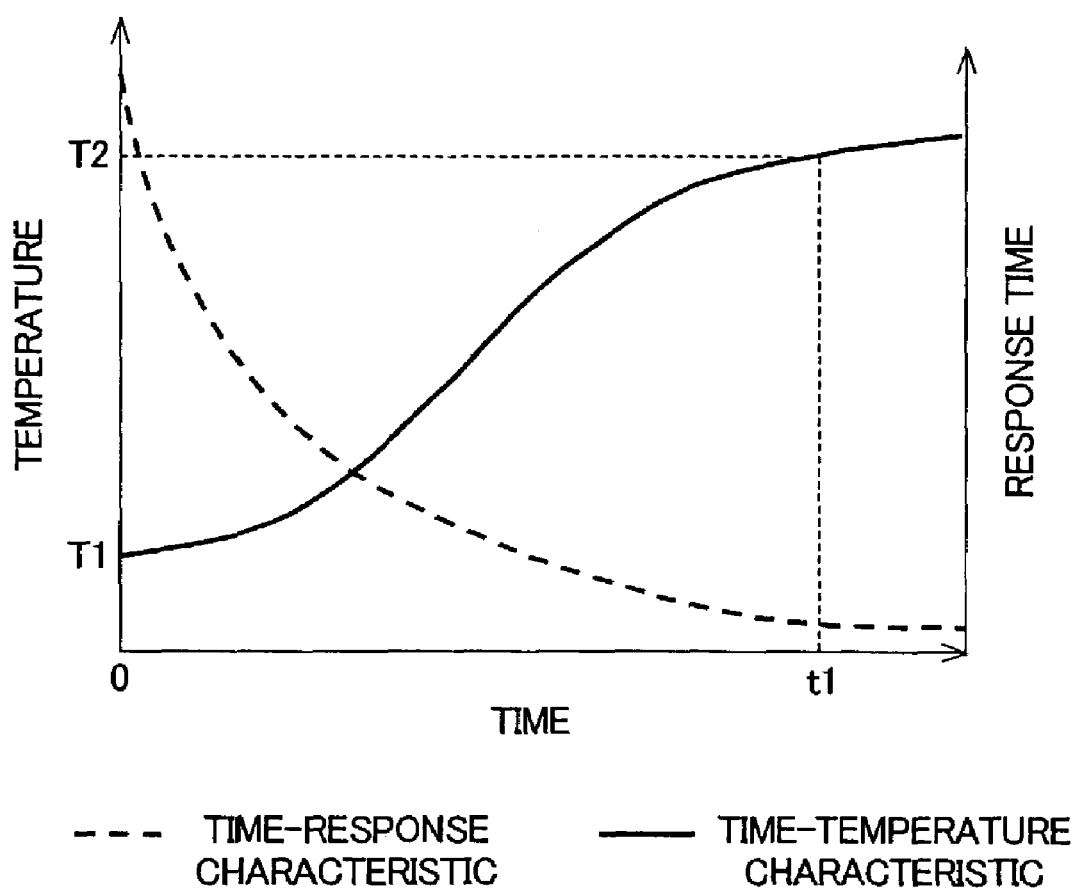
FIG. 3 shows the "time-temperature/response time" characteristics of a liquid crystal display device according to an embodiment of the present invention.
Figure 4A:
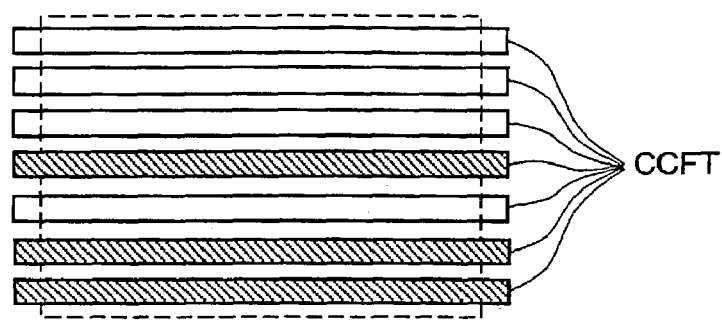
FIGS. 4A, 4B and 4C illustrate locations of backlight sources using CCFT disposed direct under the LCD panel (FIG. 4A) and side-illuminating CCFT (FIGS. 4B and 4C) relative to respective LCD panels.
Figure 4B:
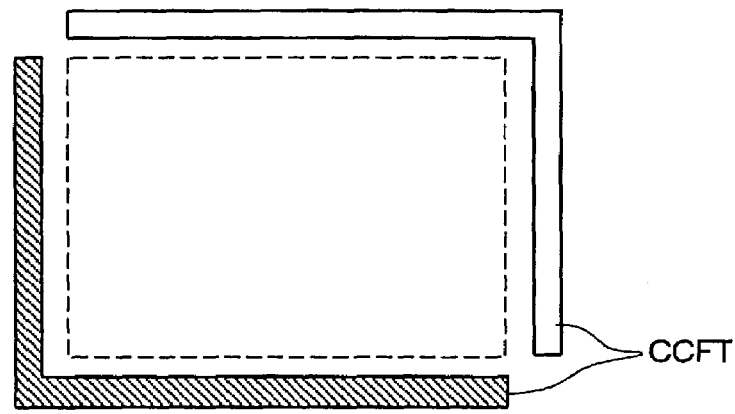
Figure 4C:
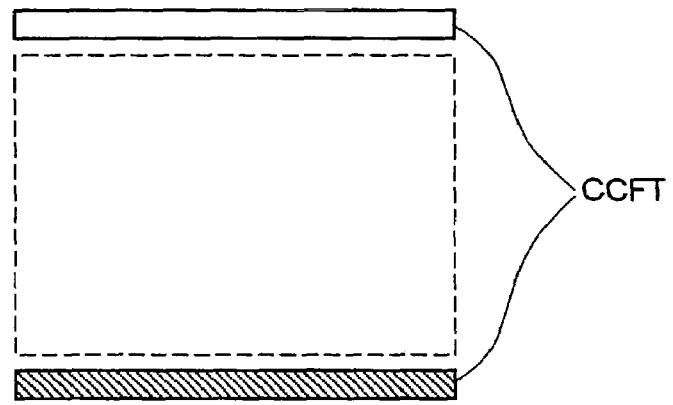

A liquid crystal display device according to an embodiment of the present invention will be described in detail below with reference to FIGS. 1 to 3 where is presented a schematic block diagram showing an essential construction (FIG. 1), a flowchart depicting the on-timer operation (FIG. 2) and "time-temperature/response time" characteristics of a liquid crystal display device according to an embodiment of the present invention (FIG. 3). FIGS. 4A, 4B and 4C illustrate the locations of backlight sources using CCFT disposed direct under the LCD panel (direct-illuminating) (FIG. 4A) and side-illuminating CCFT (FIGS. 4B and 4C) relative to the respective LCD panels.

Figure 1:
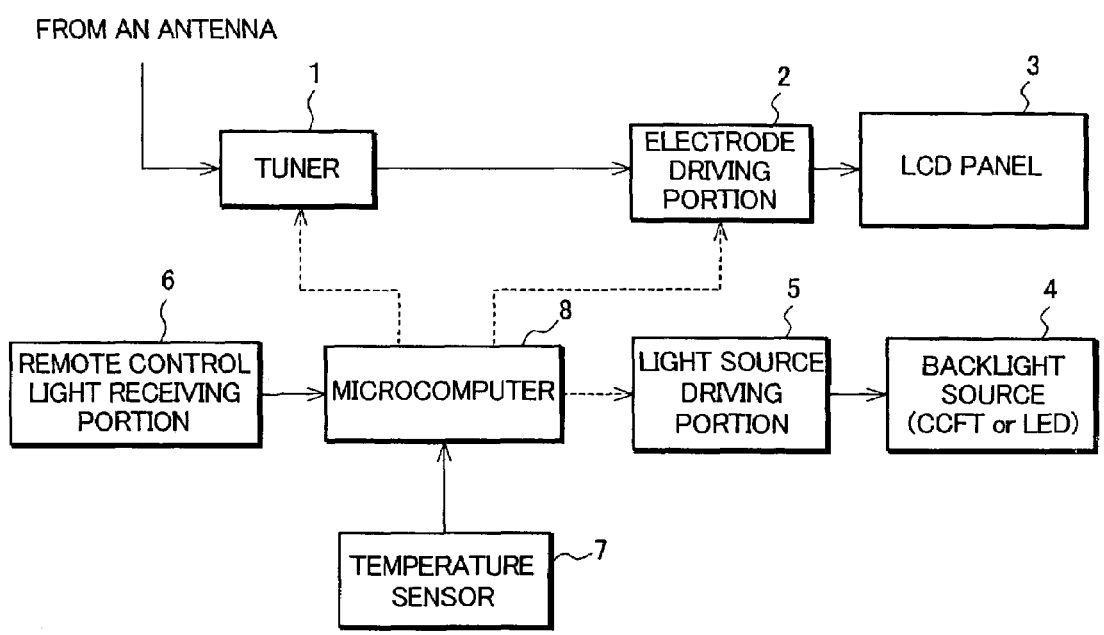
FIG. 1 is a schematic block diagram showing the construction of an essential portion of a liquid crystal display device according to an embodiment of the present invention.

Referring to FIG. 1, a liquid crystal display device in the shown embodiment comprises a tuner 1 for outputting an image signal of a designated channel of a television broadcast received from an antenna (not shown) and an electrode driving portion 2 for driving electrodes to apply a voltage to a LCD panel 3 according to the image signal of the channel selected by the tuner 1.

The device is provided with a direct-illuminating or side-illuminating type backlight source 4 disposed behind the LCD panel 3 and a light source driving portion 5 for putting on and out the backlight source 4. The backlight source 4 may be of various kinds of light generators such as for example fluorescent lamps (CCFT) and light-emitting diodes (LED).

The LCD device also has a remote control light receiving portion 6 for receiving input information signals (e.g., a viewing start time, end time, viewing channel) from a remote controller (not shown), a temperature sensor 7 for detecting an inside temperature of the device (ambient working temperature) and a microcomputer 8 for controlling the operation of the tuner 1, electrode driving portion 2, light source driving portion 5 and other not-shown circuits of the LCD device based on the various kinds of information received through the remote control light receiving portion 6 and the data detected by the temperature sensor 7.

The viewing start time, end time and channel number of a television broadcast program to be reserved for viewing can be easily preset by the user by utilizing an EPG (Electronic Program Guide) information multiplexed and transmitted as carried by the television broadcast signal. The temperature sensor 7 is desirably disposed to directly sense the temperature of the LCD panel 3. It is also possible to arrange a plurality of temperature sensors at different suitable positions in the LCD device.

Referring now to FIGS. 2 and 3, the operation of the microcomputer 8 of the shown embodiment with a reservation of a desirable video program to be viewed by using a timer ("on-timer" reservation) will be described below. The microcomputer 8 examines whether the warm-up mode of the present invention has been preset or not at the time of on-timer reservation (Step S1). If the warm-up mode has been preset, the microcomputer 8 examines whether or not it is time tn earlier than the time preset for starting viewing (the viewing start time) (Step S2). The time tn is a preset time (for example 15 minutes or 30 minutes, etc.) which may be preset to a fixed time on the workshop before shipping the device or may be preset by the user to any desirable time when using on-timer reservation.

When it reached the time tn earlier than the viewing start time, the microcomputer 8 acquires the inside temperature T1 of the device detected at that moment by the temperature sensor 7 (Step S3) and determines a time t1 necessary for rising the temperature T1 of the LCD panel 3 by heat emitted from the turned-on backlight source 4 to a normal operating temperature T2 (e.g., 60° C.) of the liquid crystal (Step S4).

The microcomputer 8 compares time t1 determined in Step S4 with time tn (Step S5). If t1 is equal to or larger than tn, the backlight source 4 is immediately turned on (Step S7) If t1 is less than tn, the microcomputer 8 examines whether the present time is the time when t1 is subtracted from the viewing start time (Step S6). When present time is just t1 before the viewing start time, the microcomputer 8 turns on the backlight source 4 (Step S7)

Thus, the backlight source 4 is driven to lighten and heat the LCD panel 3 before the viewing start time, the LCD panel 3 can reliably reach the normal operating temperature T2 at the viewing start time which is preset by user. During this warming-up period, nothing is displayed on the LCD panel screen (i.e., a black screen is presented) by applying a black signal voltage to the data electrodes of the LCD panel 3.

When the present time reached the viewing start time (Step S8), the microcomputer 8 switches on the system of the LCD device by supplying electric power to the tuner 1 and other circuits (Step S9). Therefore, an image signal of the viewing reserved channel selected by the tuner 1 is output to the electrode driving portion 2 to display the desired video image on the LCD panel 3.

At a low ambient temperature, the liquid crystal display device according to the present embodiment can present to viewers a desired video of high image quality with no degradation due to the response characteristic of liquid crystal at low temperature on the LCD panel from the viewing start time. For example, when the user programmed (repeated reservation for every day or every week, etc.) viewing a television program starting early morning in winter season, he/she can enjoy a high-quality video of the reserved program from the beginning (the viewing start time) only by presetting the warm-up mode of the device.

In the above-mentioned embodiment, the warm-up mode is preset by the user. Alternately, the LCD device may automatically do the warm-up mode operation in accordance with the ambient temperature without presetting by the user. In this case, Step S1 in FIG. 1 is not necessary and the processing may always start from Step S2. It is also possible to start the processing from Step S2 only in the case the device detected the desired program is to start for example in early morning (0:00~8:00 AM) of the winter season (from December to February) by using a calendar clock function in the microcomputer 8.

In the above-described embodiment, the backlight source 4 which has a heat generating effect is used as the heating means for warming the LCD panel 3. However, many versions may be applied. For example, the LCD panel 3 may be warmed up by heat emitted from any other circuit power supply or by using electrodes themselves of LCD panel 3 as heating elements. It is of course possible to heat the LCD panel 3 by use of a separate heating element such as a heater etc.

However, by turning on the backlight source 4 in advance before the viewing start time like the above-described embodiment it is possible not only to assure a necessary response speed of liquid crystal at the viewing start time but also to stabilize the operation of CCFT composing the backlight source 4 at the viewing start time. It is known that the CCFT can emit light having high brightness when its wall temperature is of about 50 to 70° C. Accordingly, the warm-up operation by using the backlight source assures the user of viewing the video program on the sufficiently illuminated screen of the LCD panel from the beginning of viewing the program.

Furthermore, the above-described embodiment determines a least necessary period t1 of the warm-up operation at the time tn earlier than the viewing start time for saving the power consumption of the warm-up operation of the backlight source 4 before the viewing start time. However, it is also possible to turn on the backlight source 4 for a predetermined fixed period or for any desirable period preset by the user.

In the above-described embodiment, all of CCFT or LED composing the backlight source 4 are lit at the time tn earlier than the viewing start time to heat a whole surface of the liquid crystal panel. Alternatively, it is also possible to turn on a part of CCFT/LED of the backlight source during warm-up operation before the viewing start time to further save the power consumption for rising the temperature of the LCD panel.

When all of CCFT or LED are lit for warming the LCD panel, the upper portion of the LCD panel is warmed faster than the lower portion thereof due to the effect of upward stream of warmed air. Accordingly, the warm-up operation of the LCD device before the viewing start time may be performed by turning on only CCFT disposed on the lower portion of the LCD panel as shown in FIG. 4A to 4C where CCFT to be driven for warming the LCD panel are hatched and the LCD panel is drawn by a broken line.

In this case, only a part of the backlight source is turned on in Step S7 of the flowchart shown in FIG. 2 and a whole backlight source is turned on at the time of switch on system in Step S9. This can effectively and uniformly rise the temperature of a whole surface of the LCD panel and save the power consumption during the warm-up operation of the device as compared with the case of all of the backlight source is turned on.

In the on operation (warm-up operation) of backlight source in Step S7, the warm-up operation may be performed by step-by-step increasing the number of working CCFT or LED or the number of lines of working CCFT or LED of the backlight source. In this case, the lower CCFT/LED of the backlight source shall be turned on first to uniformly rise the temperature of the LCD panel.

The device in the above-described embodiment applies a black signal voltage to data electrodes of the LCD panel 3 to present a black screen thereon during the warm-up operation till the viewing start time. It may also present on the screen a message or symbol of time until the beginning of viewing the program indicating that the device is now operating in the warm-up mode (Heating means is ON) by using OSD (On-Screen Display).

Alternatively, the device may change a screen image for example from a black level pattern to a white level pattern and reverse at a constant time interval by alternately applying different particular pattern data voltages to the electrodes of the LCD panel 3 during the warm-up operation of the LCD panel 3. In this case, molecules of liquid crystal layer of the LCD panel are forced to move intensively, resulting in improvement of the response characteristic of the liquid crystal.

In the above-described embodiment of the present invention, the time of starting viewing a video program is input by the user and preset on the timer of the device. It is also possible to use information of EPG (Electronic Program Guide). In this case, the device stores a program viewing pattern (history) by using information of EPG, presumes a television program preferred by the user based on the stored program viewing pattern and automatically conducts the warm-up operation before the time of starting the program. This also enables the user to view an interesting television program with high quality of video images from its beginning without on-timer reservation by the user.

Figure 5:
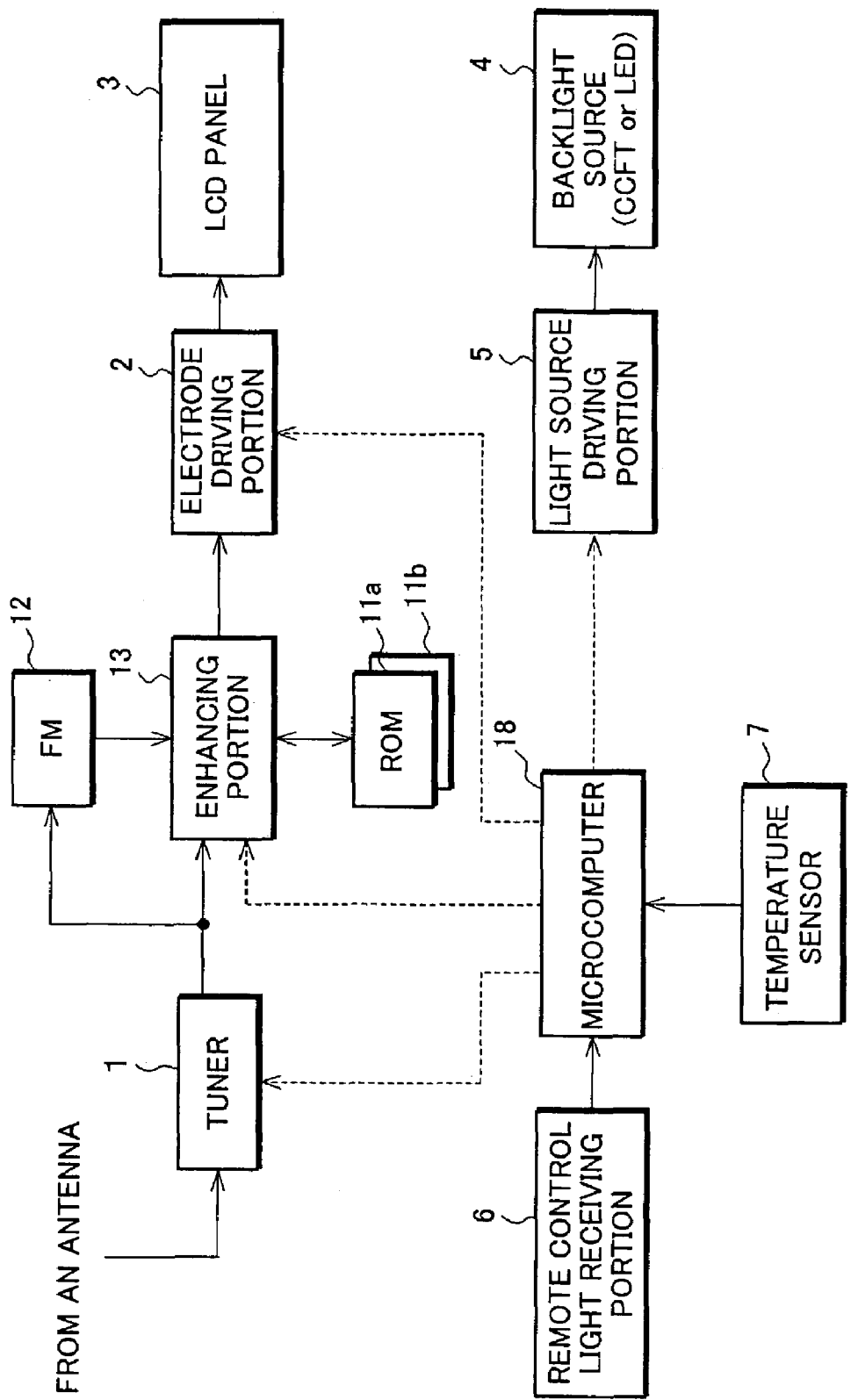
FIG. 5 is a schematic block diagram showing the construction of an essential portion of a liquid crystal display device according to another embodiment of the present invention.
Figure 7:
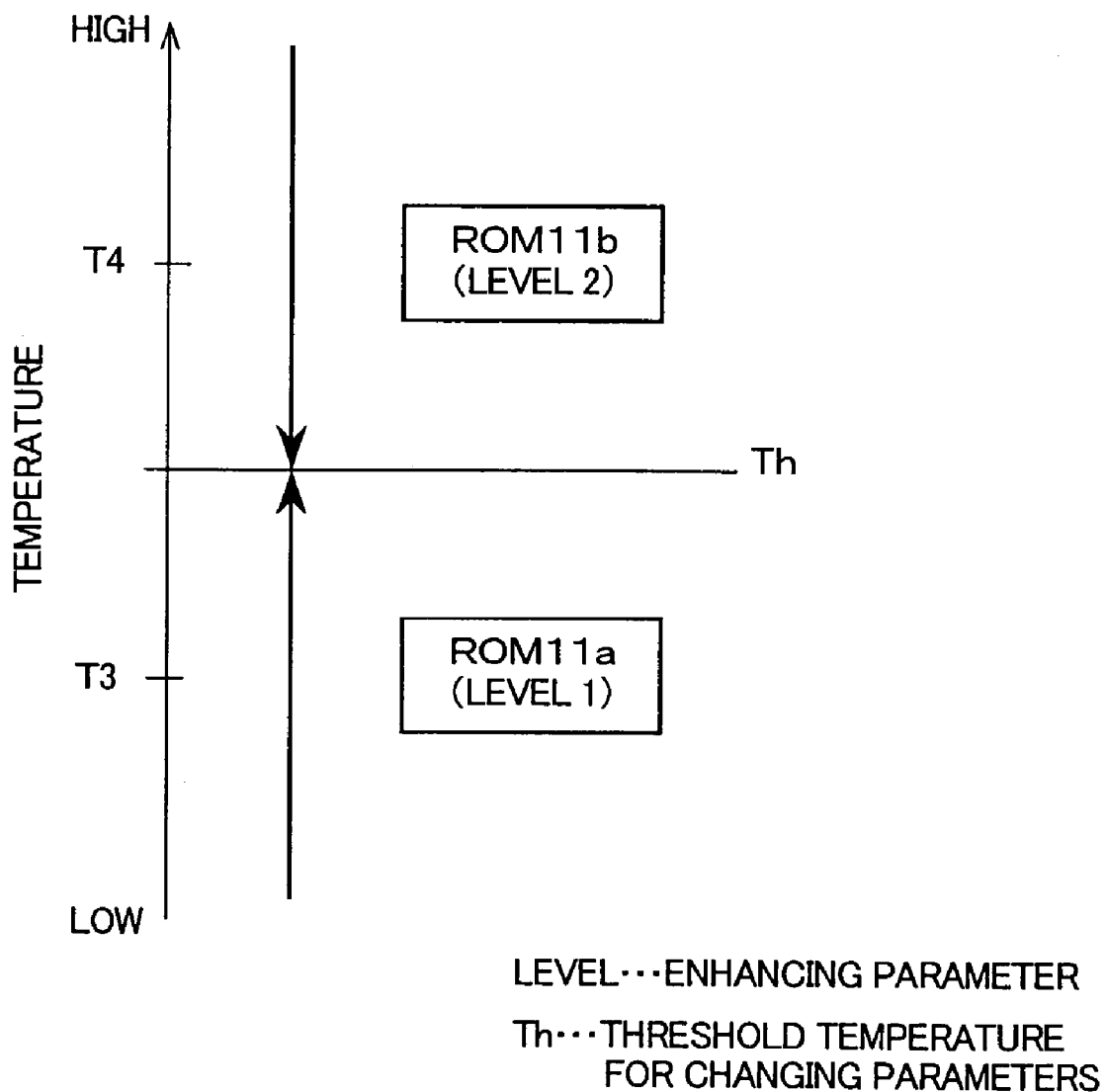
FIG. 7 shows a relationship between an inside temperature of a liquid crystal display device according to another embodiment of the present invention and contents of reference table memories.

Referring now to FIGS. 5 to 8, a liquid crystal display device according to another embodiment of the present invention will be described below in detail. In FIGS. 5 to 8, parts similar to those used in the first described embodiment are given the same numerals and characters, which parts will not be further described. FIG. 5 is a schematic block diagram showing the construction of an essential portion of the liquid crystal display device according to this embodiment. FIGS. 6A and 6B are schematic illustrations of an example of an OS (overshoot) table memory for the liquid crystal device according to this embodiment. FIG. 7 shows a relationship between an inside temperature of the LCD device and contents of reference table memory for the liquid crystal device according to the present embodiment. FIG. 8 is a graph showing a relationship between a voltage applied to the liquid crystal and a response of the liquid crystal of LCD device according to the present embodiment.

The liquid crystal display device according to the present embodiment uses a method of driving the liquid crystal display panel by applying a driving (overshoot) voltage higher than a predetermined gradation level voltage or a driving (undershoot) voltage lower than the predetermined gradation level voltage for the input image signal (input video signal) of a present frame to the LCD panel according to a combination of an input image signal of a preceding frame with an input image signal of a present frame to improve the problem of the response speed of liquid crystal. (The overshoot (OS) driving method is defined hereinafter in this specification.)

In FIG. 5, there are shown two OS table memories (ROM) 11a and 11b storing applicable voltage data (enhancing parameters) according to gradation level transition before and after one frame period of an input image signal and corresponding inside temperatures of the device. Numeral 12 designates a frame memory (FM) and numeral 13 designates an enhancing portion which compares an input image signal (current data) of a frame No. M to be displayed with an input image signal (previous data) of a frame No. M−1 stored in the frame memory 12, reads an enhancing parameter corresponding to the comparison result (gradation level transition) from the OS table memory (ROM) 11a or 11b and determines an enhanced signal (gradation level data to be written) necessary for displaying the frame No. M based on the enhancing parameter.

A microcomputer 18 outputs a table selection control signal to the enhancing portion 13 for selecting one of the OS table memories (ROM) 11a and 11b and changing an enhancing parameter according to the inside temperature detected by the temperature sensor 7. Enhancing parameters LEVEL 1 and LEVEL 2 stored in the OS table memories 11a and 11b respectively are predetermined from the measurements of optical response characteristic of the LCD panel 3, which values were measured in the environment at different reference temperatures T3 and T4 (T3<T4) respectively. The relationship of two enhancing rates are LEVEL 1>LEVEL 2.

For example, in case that the number of display signal levels, i.e., the number of display data is 256 gradation levels of 8 bits, the OS table memory (ROM) may hold enhancing parameters (actually measured values) corresponding to 256 gradation levels. Alternatively, it may hold merely enhancing parameters (actually measured values) for 9 representative gradation levels at intervals of 32 gradation levels as shown in FIGS. 6A and 6B. In this case, enhancement signals for other gradation levels may be separately calculated from the above actually measured values for example by linear interpolation. This can save the capacity of the OS table memories (ROM).

In the liquid crystal display device according to the present embodiment, the microcomputer 18 examines whether its inside temperature T1 detected by a temperature sensor 7 is lower than the threshold value Th as shown in FIG. 7, then, if so, causes the enhancing potion 13 to select the OS table memory (ROM) 11a and refer to the content thereof. The enhancing portion 13 does enhancement of the input image signal with use of enhancing parameters LEVEL 1 stored in the OS table memory (ROM) 11a.

If the inside temperature. T1 detected by the temperature sensor 7 is higher than the threshold value Th, the microcomputer 18 instructs the enhancing potion 13 to select the OS table memory (ROM) 11b and refer to the content thereof. The enhancing portion 13 does enhancement of the input image signal with use of enhancing parameters LEVEL 2 stored in the OS table memory (ROM) 11b.

By doing the overshoot driving to compensate optical response characteristic of the LCD panel 3 in accordance with the working ambient temperature, it becomes possible for the liquid crystal to achieve a specified transmittance (target gradation level luminance) of an input image signal within the period of one frame (e.g., 16.7 msec for progressive scanning at 60 Hz) as shown in FIG. 8. Thus, the target half tone of the image can be presented within a short period (1 frame period).

However, the enhancing parameters LEVEL 1 and LEVEL 2 are applicable voltage data actually measured at the reference temperatures T3 and T4, respectively, at which the application of the voltage could cause the liquid crystals to respond to a transmittance decided by an input image signal after one frame period. If the inside temperature T1 differs largely from the reference temperature T3 or T4, the enhancement by using either of the OS table memories (ROMs) 11a and 11b could not bring the liquid crystals to precisely respond to the transmittance decided by the input image signal just after one frame period. Namely, the input image signal could not correctly be displayed.

Accordingly, the liquid crystal display device in the present embodiment does warming the LCD panel 3 for a specified period before the viewing start time so that the LCD panel can reach within the period either the reference temperature T3 or T4 at which the enhancing parameters LEVEL 1 or LEVEL 2 could be measured in the environment. Thus, the LCD panel can present a high-quality video thereon from the beginning of viewing the video.

Namely, when the inside temperature T1 detected by the temperature sensor 7 at the time tn earlier than the viewing start time was equal to or lower than the reference temperature T3 (e.g., 10° C.), the microcomputer 18 determines a period t3 necessary for warming the LCD panel 3 up to the reference temperature T3 by driving the backlight source 4 to lighten at the time t3 earlier than the viewing start time to heat the LCD panel 3.

Namely, when the inside temperature T1 detected by the temperature sensor 7 at the time tn earlier than the viewing start time was higher than the reference temperature T3 and equal to or lower than the reference temperature T4 (e.g., 30° C.), the microcomputer 18 determines a period t4 necessary for warming the LCD panel 3 up to the reference temperature T4 by driving the backlight source 4 to lighten at the time t4 earlier than the viewing start time to heat the LCD panel 3.

Thus, the LCD panel 3 can be reliably warmed up to the reference temperature T3 or T4 by the viewing start time preset by user by driving the backlight source 4 to heat the liquid crystal display panel before the viewing start time. This makes it possible for the LCD panel 3 to reliably respond to a transmittance (target gradation level luminance) specified by an input image signal just after one vertical scanning period (one frame period) irrespective of the ambient temperature, thus presenting the high-quality video image from the beginning of viewing the video program.

Although the above-described embodiment selectively uses two OS table memories (ROM) 11a and 11b, which hold two different kinds of enhancing parameters LEVEL 1 and LEVEL 2 respectively corresponding to two temperature ranges, based on the detected inside temperature of the device and does the overshoot driving (enhancement) by using enhancing parameters LEVEL 1 or LEVEL 2, it may of course use any number M (M is 1 or more than 1) of enhancing parameters LEVEL 1 to LEVEL m which are selected to do adaptive overshoot driving (enhancement).

In the latter case, the LCD panel 3 is warmed up to a temperature which is higher than the detected inside temperature T1 of the device and the lowest reference temperature Tm ($1 \leq m \leq M$). This can shorten the warm-up period before the viewing start time, saving the power consumption of the warm-up operation. This also enables the liquid crystal to respond a transmittance specified by an input image signal precisely after one frame period thereon from the beginning of viewing the video program, thus providing high-quality video with no afterimage.

It is also possible to stabilize the inside temperature of the device at the reference temperature Tm after starting the viewing by adaptively cooling or holding the heat of the device by on-off operating a cooling fan (not shown) and/or heating by a separately provided heating member (not shown) such as a heater etc.

The above-described embodiment uses two OS table memories (ROM) 11a and 11b each storing enhancing parameters (applicable voltage data) arranged in a two-dimensional matrix, which parameters are addressable by an image signal of the current frame and an image signal of the previous frame and does enhancement of the current frame image signal by using designated enhancing parameters to compensate the optical response characteristic of the LCD panel to any input video image having any gradation level transition, thereby providing the correct display of the video on the LCD panel. However, it is also possible to use a single-dimensional table memory holding enhancing parameters (applicable voltage data) uniquely identified by a gradation level of an image signal of the current frame.

In the above-described embodiment, a plurality of enhancing parameters corresponding to different temperature ranges are stored in separate OS table memories (ROM). It is also possible to use a single OS table memory (ROM) capable of storing different kinds of enhancing parameters for different temperature ranges in different table areas which are adaptively referenced to by a selection control signal from the microcomputer 18. By doing so, enhancing parameters are selectively used to provide an enhanced signal to the LCD panel 3.

Furthermore, the enhancement of an input image signal to compensate the optical response characteristic of the LCD panel 3 may be also performed by using, for example, two-dimensional functions f (pre, cur) with variable representing gradation levels before and after transition which were prepared as enhancing parameters for each of temperatures of the device.

The liquid crystal display devices according to the present invention are constructed as described above and can heat the LCD panel from a specified time earlier than a reserved viewing start time so that the LCD panel can reach a temperature at which the input image can correctly displayed thereon at the viewing start time. The LCD devices can present to the user a high-quality video on the LCD panel from the beginning of viewing.

The invention claimed is:

1. A liquid crystal display device for displaying a video on a liquid crystal display panel, said liquid crystal display device is provided with:
   an inputting means for setting and inputting a time preset for starting viewing a video program;
   a heater for heating the liquid crystal display panel for a specified period of time earlier than the time preset for starting viewing a video program; and
   a main power supply for driving the liquid crystal display panel,
   wherein said main power supply is switched on after heating the liquid crystal display panel for the specified period of time.

2. A liquid crystal display device as defined in claim 1, wherein the specified period of time is determined in accordance with a working ambient temperature.

3. A liquid crystal display device as defined in claim 1, wherein the heater is a backlight source for illuminating the liquid crystal display panel.

4. A liquid crystal display device as defined in claim 3, wherein a part of the backlight source is used as the heater.

5. A liquid crystal display device as defined in claim 4, wherein the part of backlight source used as the heater corresponds to a lower portion of the liquid crystal display panel.

6. A liquid crystal display device as defined in claim 3, wherein an indicator indicating the heater being driven for warming the liquid crystal display panel is displayed as an OSD (On-Screen Display).

7. A liquid crystal display device for displaying a video on a liquid crystal display panel, comprising:
   a storage means for storing a program viewing history;
   a heating means for heating the liquid crystal display panel for a specified period of time earlier than a time for starting viewing a video program scheduled to be viewed based on the program viewing history; and
   a main power supply for driving the liquid crystal display panel,
   wherein said main power supply is switched on after heating the liquid crystal panel for the specified period of time.

8. A liquid crystal display device as defined in claim 7, wherein the specified period of time is determined in accordance with a working ambient temperature.

9. A liquid crystal display device as defined in claim 7, wherein the heating means is a backlight source for illuminating the liquid crystal display panel.

10. A liquid crystal display device as defined in claim 9, wherein a part of the backlight source is used as the heating means.

11. A liquid crystal display device as defined in claim 10, wherein the part of the backlight source used as the heating means corresponds to a lower portion of the liquid crystal display panel.

12. A liquid crystal display device as defined in claim 11, wherein an indicator indicating the heating means being driven for warming the liquid crystal display panel is displayed as OSD (On-Screen Display).

13. A liquid crystal display device as defined in claim 9, wherein an indicator indicating the heating means being driven for warming the liquid crystal display panel is displayed as OSD (On-Screen Display).

14. A liquid crystal display device as defined in claim 10, wherein an indicator indicating the heating means being driven for warming the liquid crystal display panel is displayed as OSD (On-Screen Display).

* * * * *